US012766637B2

(12) United States Patent
Li et al.

(10) Patent No.: US 12,766,637 B2
(45) Date of Patent: Oct. 20, 2026

(54) LASER CUTTING METHOD

(71) Applicant: SHENZHEN GEESUN INTELLIGENT TECHNOLOGY CO., LTD., Guangdong (CN)

(72) Inventors: Xiaoping Li, Guangdong (CN); Xueke Wu, Guangdong (CN); Binbin Xiong, Guangdong (CN); Rukun Yang, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 952 days.

(21) Appl. No.: 17/740,639

(22) Filed: May 10, 2022

(65) Prior Publication Data

US 2022/0402074 A1 Dec. 22, 2022

(30) Foreign Application Priority Data

Jun. 17, 2021 (CN) ......................... 202110671637.3

(51) Int. Cl.
*B23K 26/38* (2014.01)
*B23K 26/40* (2014.01)

(52) U.S. Cl.
CPC .............. *B23K 26/38* (2013.01); *B23K 26/40* (2013.01)

(58) Field of Classification Search
CPC ........... B65B 21/00; B65B 3/00; B65B 57/18; B65B 59/001; B65B 59/003; B65B 65/003; B65B 19/02; B65B 59/00; B65B 59/02; B65B 65/00; B67C 2003/227; B67C 3/007; B67C 7/00; B67C 3/00; B67C 3/22; G05B 19/41865; G05B 19/418; G06Q 10/00; G06Q 10/20; B23K 2103/166; B23K 26/38; B23K 26/40; Y02P 90/02; Y02E 60/10; F16D 25/0638; F16D 25/12
See application file for complete search history.

(56) References Cited

U.S. PATENT DOCUMENTS

| | | | | |
|---|---|---|---|---|
| 11,267,077 | B2 * | 3/2022 | Sakurai | H01M 4/64 |
| 2019/0267608 | A1 * | 8/2019 | Choi | H01M 4/139 |

FOREIGN PATENT DOCUMENTS

| | | | |
|---|---|---|---|
| CN | 109328412 | A | 2/2019 |
| EP | 3477754 | A1 | 5/2019 |
| JP | 2000-149911 | A | 5/2000 |

OTHER PUBLICATIONS

Office Action for Chinese Patent Application No. 202110671637.3 issued by the Chinese Patent Office on May 16, 2022.
Office Action for European Patent Application No. 22172916.3 issued by the European Patent Office on Dec. 12, 2022.

* cited by examiner

*Primary Examiner* — Woody A Lee, Jr.
*Assistant Examiner* — Adam M Eckardt
(74) *Attorney, Agent, or Firm* — IP&T GROUP LLP

(57) ABSTRACT

The present disclosure discloses a laser cutting method, which relates to the technical field of laser cutting. The laser cutting method first removes the active material on the surface of a preset position of a to-be-cut part; and then performs the laser cutting on the to-be-cut part at the preset position to cut off the to-be-cut part.

3 Claims, 3 Drawing Sheets

LASER CUTTING METHOD

CROSS-REFERENCE TO RELATED APPLICATION

The present disclosure claims the priority to the Chinese patent application filed with the Chinese Patent Office on Jun. 17, 2021 with the filing No. 2021106716373, and entitled "Laser Cutting Method", all the contents of which are incorporated herein by reference in entirety.

TECHNICAL FIELD

The present disclosure relates to the technical field of laser cutting, in particular to a laser cutting method.

BACKGROUND ART

At present, laser cutting is widely used in various technical fields due to high efficiency, flexibility and wide adaptability thereof. However, when the laser cutting is performed on some to-be-cut parts (such as positive plates of lithium-ion cell), the melted material splashes seriously, and a large number of melted beads may remain on the surface of the to-be-cut part, which affects the quality of the to-be-cut part.

In view of this, it is important to design a laser cutting method to ensure the quality of the to-be-cut part, especially in industrial production.

SUMMARY

The purpose of the present disclosure is to provide a laser cutting method, which can ensure the quality of the to-be-cut part, avoid the occurrence of material splashing, and have simple steps and high cutting efficiency.

The present disclosure is realized by using the following technical solutions.

A laser cutting method comprises steps of: removing an active material on the surface of a preset position of a to-be-cut part; and performing laser cutting on the to-be-cut part at the preset position to cut off the to-be-cut part.

Optionally, the step of removing an active material on the surface of a preset position of a to-be-cut part comprises: performing laser irradiation on the preset position of the to-be-cut part to remove the active material on the surface of the to-be-cut part.

Optionally, the to-be-cut part is of a sheet shape, and the two sides of the to-be-cut part are oppositely provided with a first active material and a second active material, and the step of removing an active material on the surface of a preset position of a to-be-cut part comprises: using a first laser beam to remove the first active material located on one side of the to-be-cut part.

Optionally, the step of performing laser cutting on the to-be-cut part at the preset position to cut off the to-be-cut part comprises: using a second laser beam to cut off the to-be-cut part.

Optionally, the laser cutting method further comprises a step of: using the second laser beam to remove the second active material located on the other side of the to-be-cut part while performing the step of performing laser cutting on the to-be-cut part at the preset position to cut off the to-be-cut part.

Optionally, after the step of performing laser cutting on the to-be-cut part at the preset position to cut off the to-be-cut part, the laser cutting method further comprises a step of: using the third laser beam to remove the second active material located on the other side of the to-be-cut part.

Optionally, the to-be-cut part is of a sheet shape, and the two sides of the to-be-cut part are oppositely provided with a first active material and a second active material, and the step of removing an active material on the surface of a preset position of a to-be-cut part comprises: using the first laser beam to remove the first active material located on one side of the to-be-cut part; and using a fourth laser beam to remove the second active material located on the other side of the to-be-cut part.

Optionally, the step of removing an active material on the surface of a preset position of a to-be-cut part comprises: coating a chemical agent on the preset position of the to-be-cut part to remove the active material on the surface of the to-be-cut part.

Optionally, the step of removing an active material on the surface of a preset position of a to-be-cut part comprises: brushing or scraping off the active material on the surface of the preset position of the to-be-cut part.

Optionally, the to-be-cut part is a positive plate, and the active material is a positive active material.

The laser cutting method provided by the present disclosure has the following beneficial effects.

The laser cutting method provided by the present disclosure first removes the active material on the surface of the preset position of the to-be-cut part; and then performs the laser cutting on the to-be-cut part at the preset position to cut off the to-be-cut part. Compared with the prior art, since the laser cutting method provided by the present disclosure performs the step of removing the active material on the surface of the preset position of the to-be-cut part, the quality of the to-be-cut part can be guaranteed, the occurrence of material splashing can be avoided, the steps are simple, and the cutting efficiency is higher.

BRIEF DESCRIPTION OF DRAWINGS

In order to illustrate the technical solutions of the embodiments of the present disclosure more clearly, the drawings needed to be used in the embodiments will be briefly introduced below, it should be understood that the following drawings only show some embodiments of the present disclosure, and therefore should not be regarded as a limitation of the scope, and for those ordinarily skilled in the art, other relevant drawings can also be obtained in light of these drawings, without using any inventive efforts.

REFERENCE SIGNS

Figure 1A:
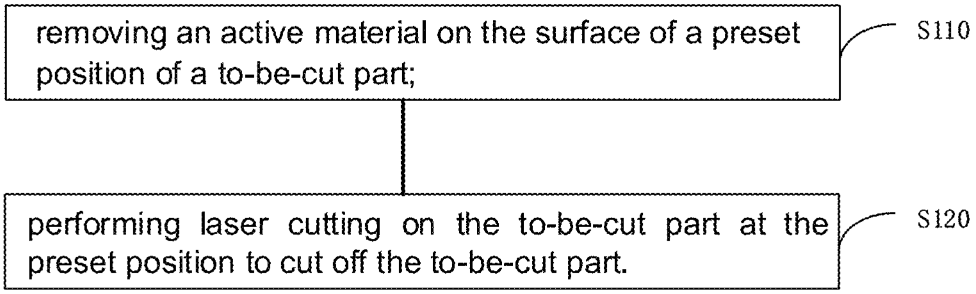
FIGS. 1A-1D are block diagrams of steps of a laser cutting method provided by embodiments of the present disclosure.

110—first laser; 120—second laser; 130—third laser; 140—fourth laser; 200—to-be-cut part; 210—first active material; 220—second active material.

DETAILED DESCRIPTION OF EMBODIMENTS

In order to make the purposes, technical solutions and advantages of the embodiments of the present disclosure clearer, the technical solutions in the embodiments of the present disclosure will be clearly and completely described below in combination with the accompanying drawings in the embodiments of the present disclosure, obviously, the described embodiments are part of the embodiments of the present disclosure, rather than all embodiments. The components of the embodiments of the present disclosure, which are generally described and shown in the accompanying drawing herein, may be arranged and designed in a variety of different configurations.

Therefore, the following detailed description of the embodiments of the present disclosure provided in the accompanying drawings is not intended to limit the claimed scope of the present disclosure, but merely represents selected embodiments of the present disclosure. Based on the embodiments in the present disclosure, all other embodiments obtained by those ordinarily skilled in the art, without making inventive effort, fall within the protection scope of the present disclosure.

It should be noted that similar reference numerals and letters indicate similar items in the following accompanying drawings, therefore, once a certain item is defined in one drawing, it does not need to be further defined and explained in the subsequent drawings.

In the description of the present disclosure, it should be noted that the orientation or positional relationship indicated by the terms such as "inner", "outer" "upper", "lower", and "horizontal" are based on the orientation or positional relationship as shown in the accompanying drawings, or it is the orientation or positional relationship that the product of the present disclosure is usually placed in use, merely for facilitating the description of the present disclosure and simplifying the description, rather than indicating or implying that related devices or elements have to be in the specific orientation, or configured and operated in a specific orientation, therefore, they should not be construed as limitations on the present disclosure. Besides, terms "first", "second" and "third" etc. are merely for distinguishing the description, but should not be construed as indicating or implying importance in relativity.

In the description of the present disclosure, it should be noted that, unless otherwise definitely specified and limited, the terms "provide", "link", "mount" and "connect" should be understood in a broad sense, for example, they can be fixed connection, detachable connection or integrated connection; they can be mechanical connection or electrical connection; they can be directly attached or indirectly attached by intermediate medium, and can be the internal communication between two components. For those ordinarily skilled in the art, the specific meaning of the above terms in the present disclosure can be understood according to the specific situation.

Some embodiments of the present disclosure will be described in detail below in combination with the accompanying drawings. The features of the embodiments described below may be combined with each other without conflict.

In the production process of lithium-ion cell, the positive plate of lithium-ion cell needs to be cut off, however, when the laser cutting is performed on the positive plate, the melted material splashes seriously, and a large number of melted beads may remain on the surface of the positive plate, which affects the quality of positive plate, thereby affecting the quality of the lithium-ion cell.

Therefore, through experimental research and theoretical analysis of the mechanism of the interaction between the laser and the material to be cut, the inventor has determined that the cause of the splashing is that a violent reduction reaction occurs between the carrier aluminum foil and the ternary positive electrode material of the positive plate due to the local high temperature of the laser. Especially, the ternary and lithium cobalt oxide positive electrode material with layered microscopic crystal structure has high oxygen content and poor structural stability, which are easier to have an aluminothermic reduction reaction with the carrier aluminum foil, the reaction is exothermic and the temperature rise can reach 3000 degrees, resulting in serious material splashing.

In the process of performing laser cutting on the positive plate, the gas temperature near the cut place rises rapidly, such that the gas is ionized and expanded violently, resulting in the splashing of the molten materials, which seriously affects the quality of the positive plate. In addition, the lithium in the ternary material may be reduced at high temperature and be in a plasma or atomic state, the lithium atoms in this state react violently with oxygen and moisture in the air to further increase the temperature, which aggravates the degree of splashing, and expands the heat-affected area, resulting in a decrease in the performance of the positive plate and even uselessness.

The inventor found through research that if the laser power is reduced to cut the positive plate, the material splashing can be alleviated, but the cutting efficiency will be greatly reduced. Therefore, the present disclosure provides a laser cutting method, which can improve the cutting efficiency on the premise of ensuring the quality of the positive plate.

First Example

Figure 1B:
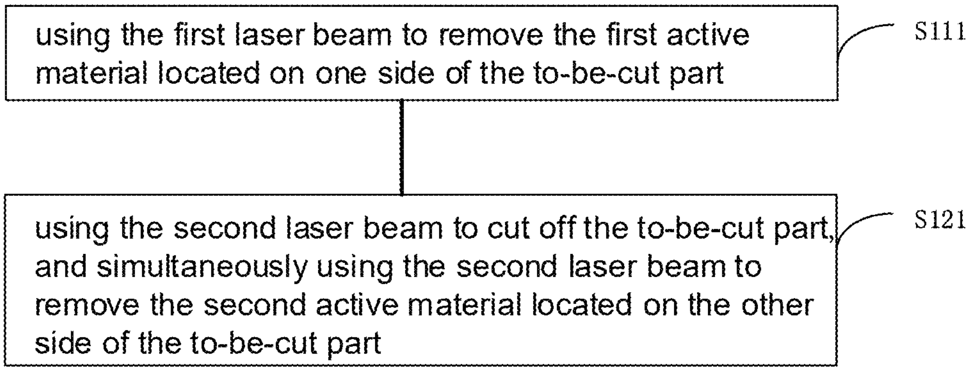
Figure 2:
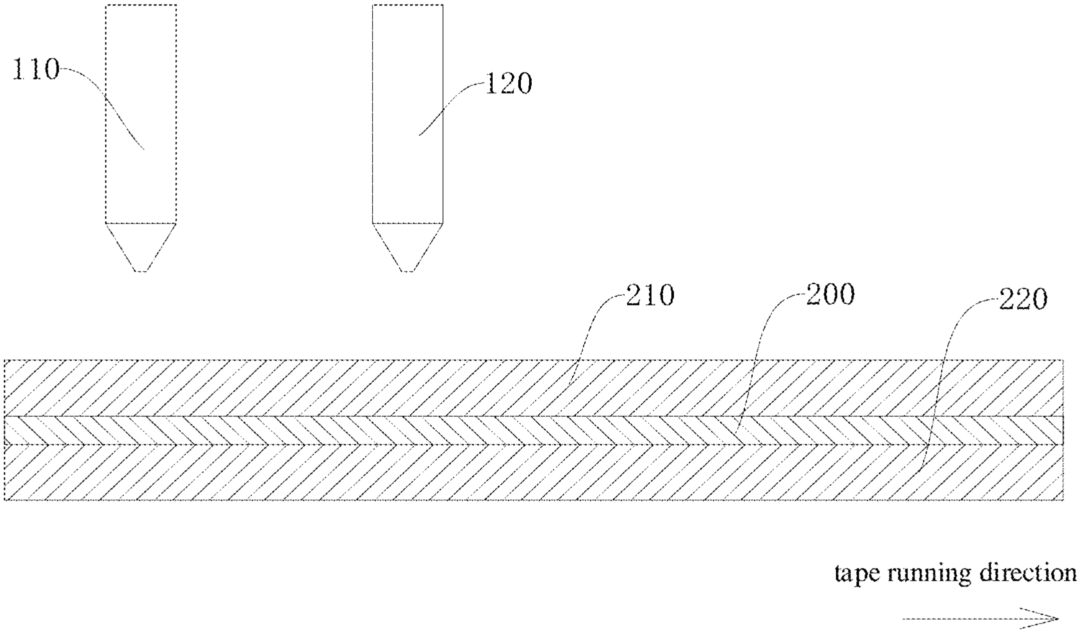
FIG. 2 is a structural schematic view of the laser cutting method provided by the first embodiment of the present disclosure applied to a to-be-cut part.

Referring to FIGS. 1A-1B and FIG. 2 in combination, an embodiment of the present disclosure provides a laser cutting method, which is used for performing the laser cutting on a to-be-cut part 200. It can ensure the quality of the to-be-cut part 200, and avoid the occurrence of material splashing, the steps are simple, and the cutting efficiency is higher.

It should be noted that the to-be-cut part 200 is of a sheet shape, the surface of the to-be-cut part 200 is provided with an active material, and the to-be-cut part 200 is moved in the tape running direction (moving direction), so as to facilitate the laser cutting. Specifically, the active material includes a first active material 210 and a second active material 220, and the first active material 210 and the second active material 220 are oppositely provided on two sides of the to-be-cut part 200.

In this embodiment, the to-be-cut part 200 is a positive plate, and the surface of the positive plate is provided with a positive active material, the laser cutting method is used for performing laser cutting on the positive plate, but it is not only limited to this, in other embodiments, the laser cutting method can also be used for performing laser cutting on the other materials, and the application scenarios of the laser cutting method are not specifically limited.

The laser cutting method includes the following steps.

Step S110: removing an active material on the surface of a preset position of a to-be-cut part 200.

It should be noted that, in step S110, the active material on the to-be-cut part 200 is removed, so as to avoid the occurrence of material splashing caused by the violent reduction reaction occurred between the to-be-cut part 200 and the active material when the to-be-cut part 200 is subsequently cut. In this embodiment, the ternary positive electrode material on the carrier aluminum foil of the positive plate is removed, so as to avoid the violent reduction reaction occurred between the carrier aluminum foil and the ternary positive electrode material when the carrier aluminum foil is subsequently cut, thereby avoiding the occurrence of material splashing and ensuring the quality of the positive plate.

In this embodiment, laser irradiation is performed on the preset position of the to-be-cut part 200 to remove the active material on the surface of the to-be-cut part 200. But it is not only limited to this, in other embodiments, a chemical agent may be coated to the preset position of the to-be-cut part 200 to remove the active material on the surface of the to-be-cut part 200, that is, to remove the active material by chemical reaction; the active material on the surface of the preset position of the to-be-cut part 200 may also be brushed or scraped off, that is, the active material is removed by physical method; and the method of removing the active material is not specifically limited.

Specifically, step S110 includes a following step.

Step S111: using the first laser beam to remove the first active material 210 located on one side of the to-be-cut part 200.

It should be noted that, in step S111, the first laser 110 is used to emit a first laser beam to the preset position of the to-be-cut part 200, so as to remove the first active material 210 at the preset position. Specifically, the first active material 210 is of a single-layer shape, and the first laser beam cuts off the first active material 210 at the preset position, so as to form a groove on the first active material 210, thereby exposing the to-be-cut part 200 located below the first active material 210, which is convenient for subsequent cutting the to-be-cut part.

Step S120: performing laser cutting on the to-be-cut part 200 at the preset position to cut off the to-be-cut part 200.

Specifically, step S120 includes a following step.

Step S121: using the second laser beam to cut off the to-be-cut part 200, and simultaneously using the second laser beam to remove the second active material 220 located on the other side of the to-be-cut part 200.

It should be noted that, in step S121, the second laser 120 is used to emit the second laser beam to the preset position of the to-be-cut part 200, so as to remove the second active material 220 while cutting the to-be-cut part 200.

Specifically, the second active material 220 is of a single-layer shape, and the second laser beam cuts off the to-be-cut part 200 at the preset position, and at the same time, the second laser beam cuts off the second active material 220 located below the to-be-cut part 200, so as to complete the entire laser cutting for the to-be-cut part 200.

It is worth noting that the laser cutting method uses the method of layered cutting to perform laser cutting on the to-be-cut part 200, wherein the energy densities of the first laser beam and the second laser beam used for layered cutting are different to ensure the reliability of the layered cutting.

Specifically, when using the first laser beam to remove the first active material 210, the energy density of the first laser beam is relatively small, such that it can only remove the first active material 210 without causing damage to the to-be-cut part 200, that is, the first laser beam can only remove the ternary positive electrode material without damaging the carrier aluminum foil, in this way, the temperature of the ternary positive electrode material is relatively low, there is no aluminothermic reduction reaction with the carrier aluminum foil, thereby avoiding the occurrence of material splashing. However, when the second laser beam is used to cut off the to-be-cut part 200, the energy density of the second laser beam is relatively large, so that the to-be-cut part 200 and the second active material 220 can be easily cut off, and the cutting efficiency is high, at this time, as the second active material 220 is located on the back side of the to-be-cut part 200, and the second laser beam does not directly irradiate on the second active material 220, that is, the second laser beam does not directly irradiate on the ternary positive electrode material, and the temperature of the ternary positive electrode material is relatively low, there is no aluminothermic reduction reaction with the carrier aluminum foil, thereby avoiding the occurrence of material splashing.

The laser cutting method provided by the embodiment of the present disclosure first removes the active material on the surface of the preset position of the to-be-cut part 200; and subsequently performs laser cutting on the to-be-cut part 200 at the preset position to cut off the to-be-cut part 200. Compared with the prior art, since the laser cutting method provided by the present disclosure performs the step of removing the active material on the surface of the preset position of the to-be-cut part 200, the quality of the to-be-cut part 200 can be guaranteed, and the occurrence of material splashing can be avoided, the steps are simple, and the cutting efficiency is higher.

Second Example

Figure 1C:
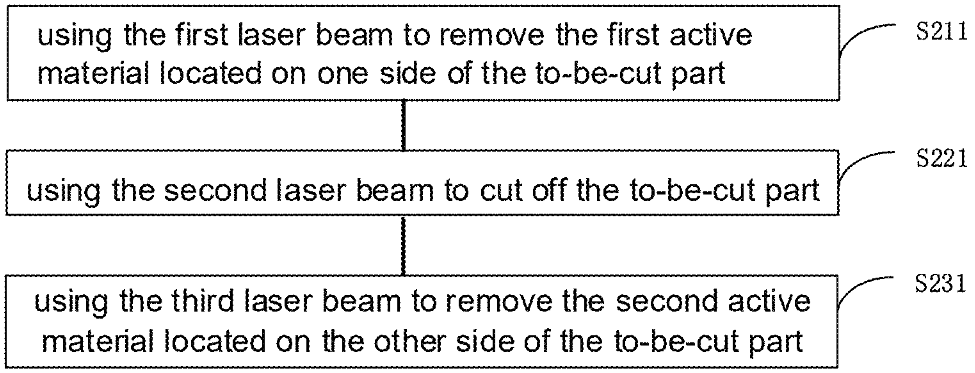
Figure 3:
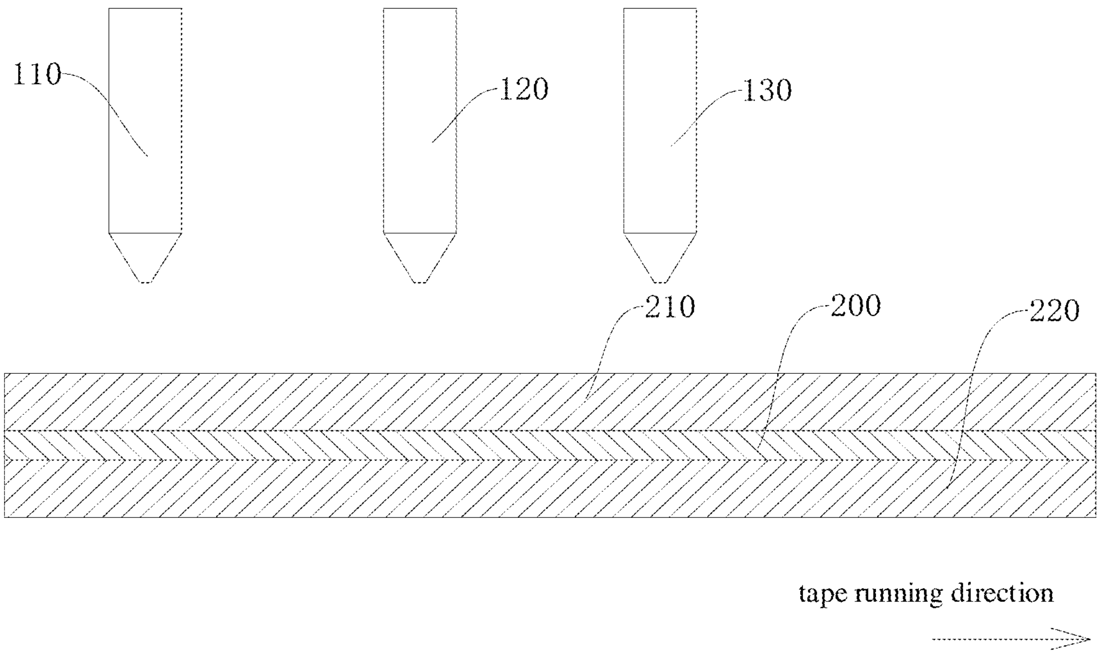
FIG. 3 is a structural schematic view of the laser cutting method provided by the second embodiment of the present disclosure applied to the to-be-cut part.

Referring to FIG. 1C and FIG. 3, an embodiment of the present disclosure provides a laser cutting method, compared with the first example, the difference of the present embodiment is that the laser cutting mode is different.

Step S211: using the first laser beam to remove the first active material 210 located on one side of the to-be-cut part 200.

Step S221: using the second laser beam to cut off the to-be-cut part 200.

It should be noted that, in step S221, the second laser 120 is used to emit a second laser beam to the preset position of the to-be-cut part 200, so as to cut off the to-be-cut part 200 without causing damage to the second active material 220. Specifically, the second laser 120 performs laser cutting on the to-be-cut part 200 through the method of scanning and cutting for multiple times, so that the second laser beam can only cut off the to-be-cut part 200 without affecting the second active material 220.

Step S231: using the third laser beam to remove the second active material 220 located on the other side of the to-be-cut part 200.

It should be noted that, in step S231, since the to-be-cut part 200 has been cut off, the second active material 220 can be removed by a third laser beam with any energy density. The third laser 130 is used to emit the third laser beam to the preset position to remove the second active material 220 at the preset position, at this time, the third laser beam only acts on the ternary positive electrode material, and there is no aluminothermic reduction reaction with the carrier aluminum foil, thereby avoiding the occurrence of material splashing.

The beneficial effects of the laser cutting method provided by the embodiment of the present disclosure are the same as those of the first example, which are not repeated here.

Third Example

Figure 1D:
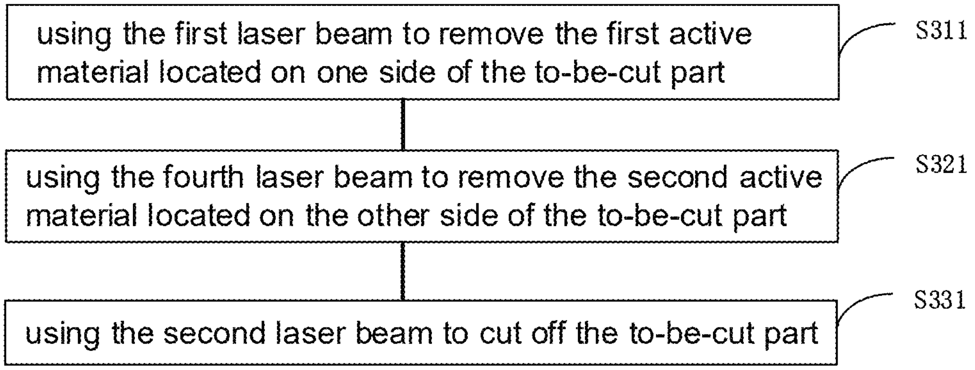
Figure 4:
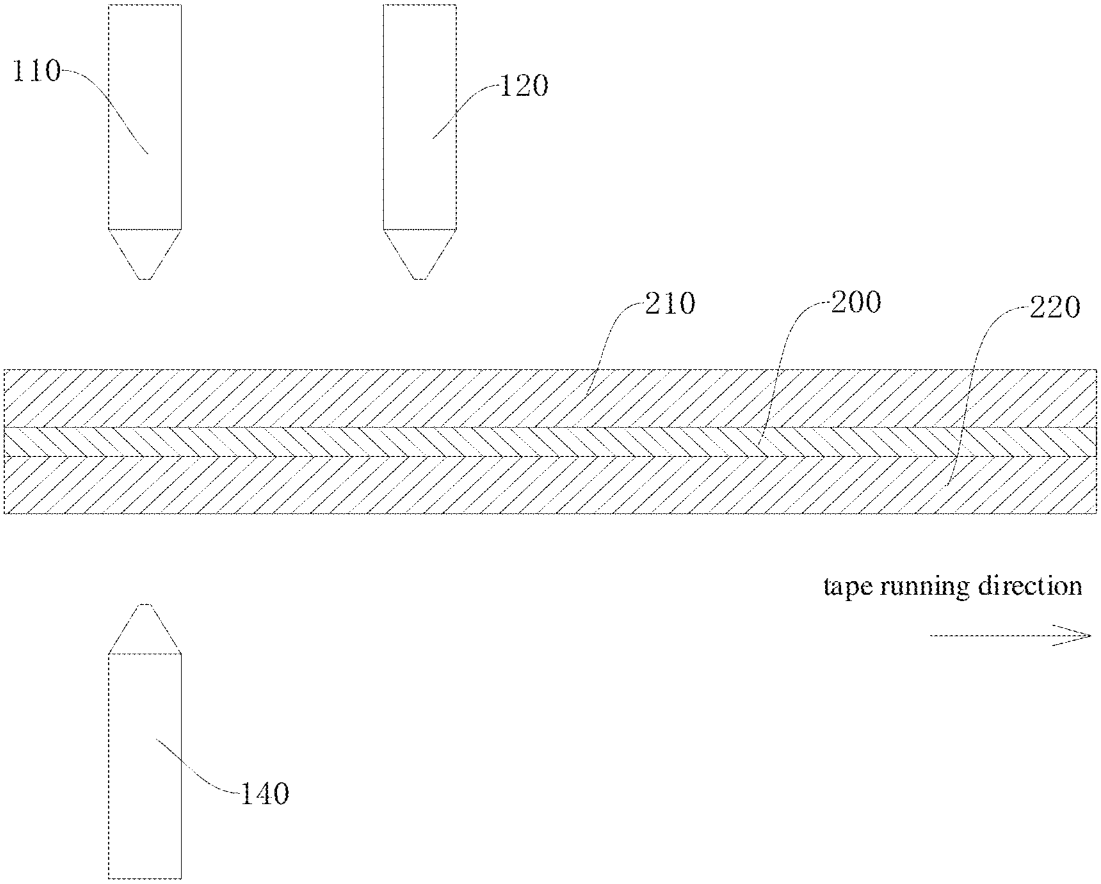
FIG. 4 is a structural schematic view of the laser cutting method provided by the third embodiment of the present disclosure applied to the to-be-cut part.

Referring to FIG. 1D and FIG. 4, an embodiment of the present disclosure provides a laser cutting method, compared with the first example, the difference of the present embodiment is that the laser cutting mode is different.

Step S311: using the first laser beam to remove the first active material 210 located on one side of the to-be-cut part 200.

Step S321: using the fourth laser beam to remove the second active material 220 located on the other side of the to-be-cut part 200.

It should be noted that, in step S321, the fourth laser 140 is used to emit the first laser beam to the preset position of the to-be-cut part 200, so as to remove the second active material 220 at the preset position. Specifically, the second active material 220 is of a single-layer shape, and the fourth laser beam cuts off the second active material 220 at the preset position to form a groove on the second active material 220, thereby exposing the to-be-cut part 200, which is convenient for subsequent cutting the to-be-cut part. Specifically, the energy density of the fourth laser beam is relatively small, so it can only remove the second active material 220 without causing damage to the to-be-cut part 200.

Step S331: using the second laser beam to cut off the to-be-cut part 200.

It should be noted that, in step S331, the energy density of the second laser beam is relatively large, and the second laser 120 is used to emit the second laser beam to the preset position of the to-be-cut part 200 to easily cut off the to-be-cut part 200.

The beneficial effects of the laser cutting method provided by the embodiment of the present disclosure are the same as those of the first example, which are not repeated here.

The above are only preferred embodiments of the present disclosure, and are not intended to limit the present disclosure, for those skilled in the art, the present disclosure may have various modifications and changes. Any modification, equivalent replacement, improvement and the like made within the spirit and principle of the present disclosure shall be included within the protection scope of the present disclosure.

What is claimed is:

1. A laser cutting method, comprising steps of:

removing an active material on a surface of a preset position of a to-be-cut part; and performing laser cutting on the to-be-cut part at the preset position to cut off the to-be-cut part;

wherein the to-be-cut part is of a sheet shape, and two sides of the to-be-cut part are oppositely provided with a first active material and a second active material, and the step of removing an active material on a surface of a preset position of a to-be-cut part comprises:

using a first laser beam to perform laser irradiation on the preset position of the to-be-cut part to remove the first active material located on one side of the to-be-cut part;

wherein the step of performing laser cutting on the to-be-cut part at the preset position to cut off the to-be-cut part comprises:

using a second laser beam to cut off the to-be-cut part;

wherein the laser cutting method further comprises:

using the second laser beam to remove the second active material located on the other side of the to-be-cut part while performing the step of performing laser cutting on the to-be-cut part at the preset position to cut off the to-be-cut part; wherein an energy density of the first laser beam is less than an energy density of the second laser beam; and the to-be-cut part is a positive plate comprising a carrier aluminum foil, and the active material comprises a lithium cobalt oxide positive electrode material.

2. The laser cutting method according to claim 1, wherein the step of removing an active material on a surface of a preset position of a to-be-cut part comprises:

coating a chemical agent on the preset position of the to-be-cut part to remove the active material on the surface of the to-be-cut part.

3. The laser cutting method according to claim 1, wherein the step of removing an active material on a surface of a preset position of a to-be-cut part comprises:

brushing or scraping off the active material on the surface of the preset position of the to-be-cut part.

* * * * *